(12) United States Patent
Sawada et al.

(10) Patent No.: US 12,063,330 B2
(45) Date of Patent: Aug. 13, 2024

(54) PRINTING APPARATUS AND CONTROL METHOD THEREOF

(71) Applicant: CANON KABUSHIKI KAISHA, Tokyo (JP)

(72) Inventors: Takashi Sawada, Saitama (JP); Makoto Tanaka, Kanagawa (JP); Kazunari Shishido, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/197,206

(22) Filed: May 15, 2023

(65) Prior Publication Data

US 2023/0379415 A1 Nov. 23, 2023

(30) Foreign Application Priority Data

May 18, 2022 (JP) ................................. 2022-081720

(51) Int. Cl.
*G06F 3/12* (2006.01)
*B41J 29/393* (2006.01)
*H04N 1/00* (2006.01)

(52) U.S. Cl.
CPC ........ *H04N 1/00344* (2013.01); *B41J 29/393* (2013.01)

(58) Field of Classification Search
CPC ........................... H04N 1/00344; B41J 29/393
See application file for complete search history.

(56) References Cited

U.S. PATENT DOCUMENTS

2007/0180159 A1* 8/2007 Takahashi .......... G03G 15/5079
710/8

FOREIGN PATENT DOCUMENTS

| JP | 2012-187717 A | | 10/2012 | |
|----|---------------|---|---------|----|
| JP | 2015128870 A | * | 7/2015 | ............ B41J 2/0451 |
| JP | 2017043006 A | * | 3/2017 | |

* cited by examiner

*Primary Examiner* — Huo Long Chen
(74) *Attorney, Agent, or Firm* — VENABLE LLP (57) ABSTRACT

A printing apparatus accepts a start instruction of a printing operation and controls, in a case where the instruction is accepted during execution of a maintenance operation and a specific condition is satisfied, to interrupt the maintenance operation and start the printing operation. The specific condition includes that an accumulated time from a start of the maintenance operation to an interruption of the maintenance operation is shorter than a threshold value. In a case where the instruction is accepted during execution of the maintenance operation and the specific condition is not satisfied, the printing operation is started after the maintenance operation is complete.

11 Claims, 11 Drawing Sheets

PRINTING APPARATUS AND CONTROL METHOD THEREOF

BACKGROUND OF THE INVENTION

Field of the Invention

The present invention mainly relates to a printing apparatus.

Description of the Related Art

Some printing apparatuses improve throughput by, if an interrupt of a printing job of a different printing mode occurs, allowing the interrupt based on the printing mode change time (Japanese Patent Laid-Open No. 2012-187718).

In general, in addition to a printing operation of performing printing on a paper sheet, the printing apparatus can execute a predetermined maintenance operation to ensure proper operations of respective components of the printing apparatus. Since execution of the printing operation is restricted during the maintenance operation, the start of the printing operation is suppressed until the maintenance operation is complete. During the suppression, the user of the printing apparatus is made to wait, which is so-called downtime. In the configuration described in patent literature 1, no consideration is given to the maintenance operation, so that there is room for improvement in terms of improving usability.

SUMMARY OF THE INVENTION

The present invention has been made in recognition of the above problem by the inventor, and provides a technique advantageous in improving the usability of a printing apparatus.

One of the aspects of the present invention provides a printing apparatus capable of executing a printing operation of performing printing using a printhead and a predetermined maintenance operation, the apparatus comprising an acceptance unit configured to accept a start instruction of the printing operation, and a determination unit configured to determine, if the instruction is accepted during execution of the maintenance operation, whether to interrupt the maintenance operation and start the printing operation or to start the printing operation after the maintenance operation is complete.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
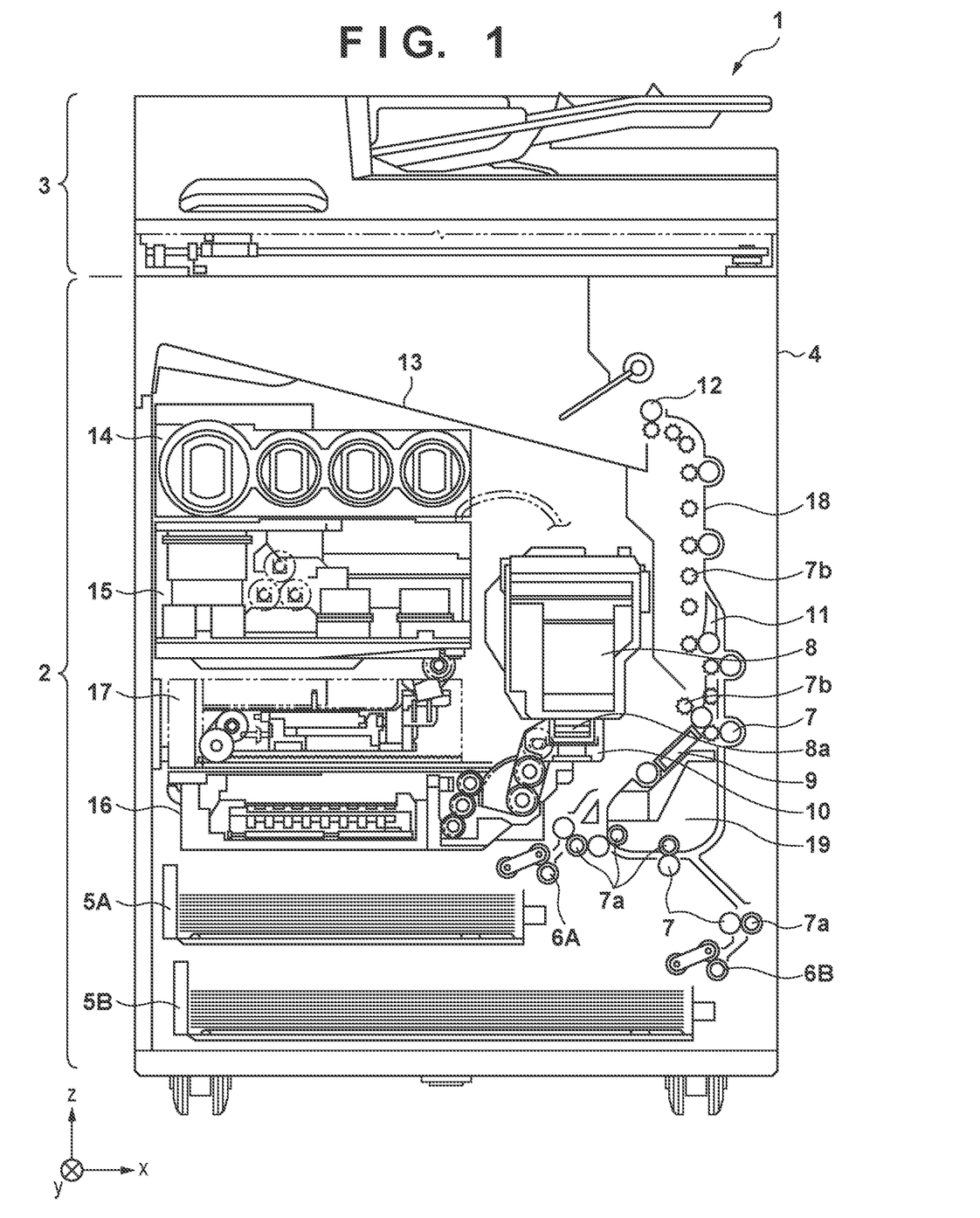
FIG. 1 is a schematic view showing the internal arrangement of a printing apparatus 1 according to an embodiment.

FIG. 1 is a schematic view showing the internal arrangement of a printing apparatus 1 according to an embodiment. The printing apparatus 1 is configured to be capable of executing printing on a predetermined paper sheet (such as a cut sheet, which may also be expressed as a print medium) by an inkjet printing method. In FIG. 1, the x direction indicates the left-and-right direction or the widthwise direction, the y direction indicates the front-and-back direction or the depth direction, and the z direction indicates the vertical direction or the height direction. Note that "printing" here indicates forming characters, graphics, photographs, or the like on a paper sheet.

In this embodiment, the printing apparatus 1 includes a print unit 2 and a scanner unit 3. With this, the printing apparatus 1 can execute a printing operation of performing printing on a paper sheet, and a reading operation of reading an image from a document (a paper sheet with the image formed thereon). Here, the printing operation and the reading operation may be performed individually, or may be performed at substantially the same time (in synchronization with each other).

The scanner unit 3 includes an Automatic Document Feeder (ADF) and a Flatbed Scanner (FBS). The scanner unit 3 reads paper sheets sequentially fed by the ADF, and reads a document placed on a document table of the FBS by a user. These reading operations may be referred to as scanning. Note that as another embodiment, the printing apparatus 1 may not include the scanner unit 3, that is, the reading function of reading an image from a document may be omitted.

The print unit 2 includes a first cassette 5A, a second cassette 5B, a first feeding unit 6A, a second feeding unit 6B, conveyance rollers 7, pinch rollers 7a, spurs 7b, a printhead 8, a flapper 11, discharge rollers 12, a guide 18, and an inner guide 19.

The cassettes 5A and 5B are detachably installed in the bottom portion of a housing 4, and configured to be capable of storing one or more paper sheets. Relatively small (for example, A4 size) paper sheets can be stacked and stored in the cassette 5A, and relatively large (for example, A3 size) paper sheets can be stacked and stored in the cassette 5B.

The first feeding unit 6A is provided near the cassette 5A. The first feeding unit 6A is configured to be capable of accessing the cassette 5A, and separating and feeding the paper sheets one by one from the cassette 5A. Similarly, the second feeding unit 6B is provided near the cassette 5B. With this arrangement, during a printing operation, the paper sheets are sequentially picked up and selectively conveyed from the cassettes 5A and 5B.

Note that the arrangement including the two cassettes 5A and 5B is exemplarily shown here, but the number of cassettes is not limited to this example (the same applies to the feeding units 6A and 6B).

The conveyance rollers 7, the pinch rollers 7a, the spurs 7b, the discharge rollers 12, the guide 18, the inner guide 19, and the flapper 11 are directly/indirectly controlled to convey the paper sheet while guiding the paper sheet in a predetermined direction. In this point of view, they can be regarded as forming a conveyance mechanism for conveying the paper sheet along a predetermined conveyance path.

The conveyance rollers 7 are driving rollers arranged on the upstream side of the printhead 8 and driven by a conveyance motor (not shown). The pinch rollers 7a are driven rollers that rotate while nipping the paper sheet together with the conveyance rollers 7. The discharge rollers 12 are driving rollers arranged on the downstream side of the printhead 8 and driven by a conveyance motor (not shown). The spurs 7b convey the paper sheet by rotating while nipping the paper sheet together with the discharge rollers 12. Alternatively, the spurs 7b rotate independently to guide the paper sheet.

The guide 18 is provided in a paper sheet conveyance path, and guides the paper sheet in the predetermined direction. The inner guide 19 is formed by a member extending in the y direction, and has a curved side surface, thereby guiding the paper sheet along the side surface. The flapper 11 can switch the conveyance direction of the paper sheet during a double-sided printing operation in which printing is performed on both surfaces of the paper sheet. The paper sheet having undergone the printing operation is discharged or stacked on a discharge tray 13 by the discharge rollers 12 and held on the discharge tray 13.

In this embodiment, the printhead 8 is a color line head (a printhead or full-line head extending over the entire region of the paper sheet in the widthwise direction). In the printhead 8, a plurality of nozzles capable of discharging ink based on printing data are arrayed in the y direction. When a printing operation is not executed, the printhead 8 waits at a waiting position, and a nozzle surface 8a of the printhead 8 can be capped by a cap unit 10 of a maintenance unit 16. When a printing operation is executed, a print controller 202 changes the posture of the printhead 8 such that the nozzle surface 8a faces a platen 9. The platen 9 is formed by a flat plate extending in the y direction, and supports, from the opposite side of the printhead 8, the paper sheet to undergo printing by the printhead 8.

An ink tank unit 14 contains one or more kinds of ink (for example, four colors of ink), and the ink is supplied to the printhead 8. The ink supply unit 15 is provided in a channel connecting the ink tank unit 14 and the printhead 8, and can adjust the pressure and flow rate of ink in the printhead 8. In this embodiment, the ink circulates between the printhead 8 and the ink tank unit 14, and the ink supply unit 15 adjusts the pressure of the ink supplied to the printhead 8 and the flow rate of the ink collected from the printhead 8.

The print unit 2 further includes the maintenance unit 16. The maintenance unit 16 includes a wiping unit 17 in addition to the cap unit 10. The maintenance unit 16 performs a maintenance operation of the printhead 8 by operating the cap unit 10 and the wiping unit 17 at predetermined timings.

Figure 2:
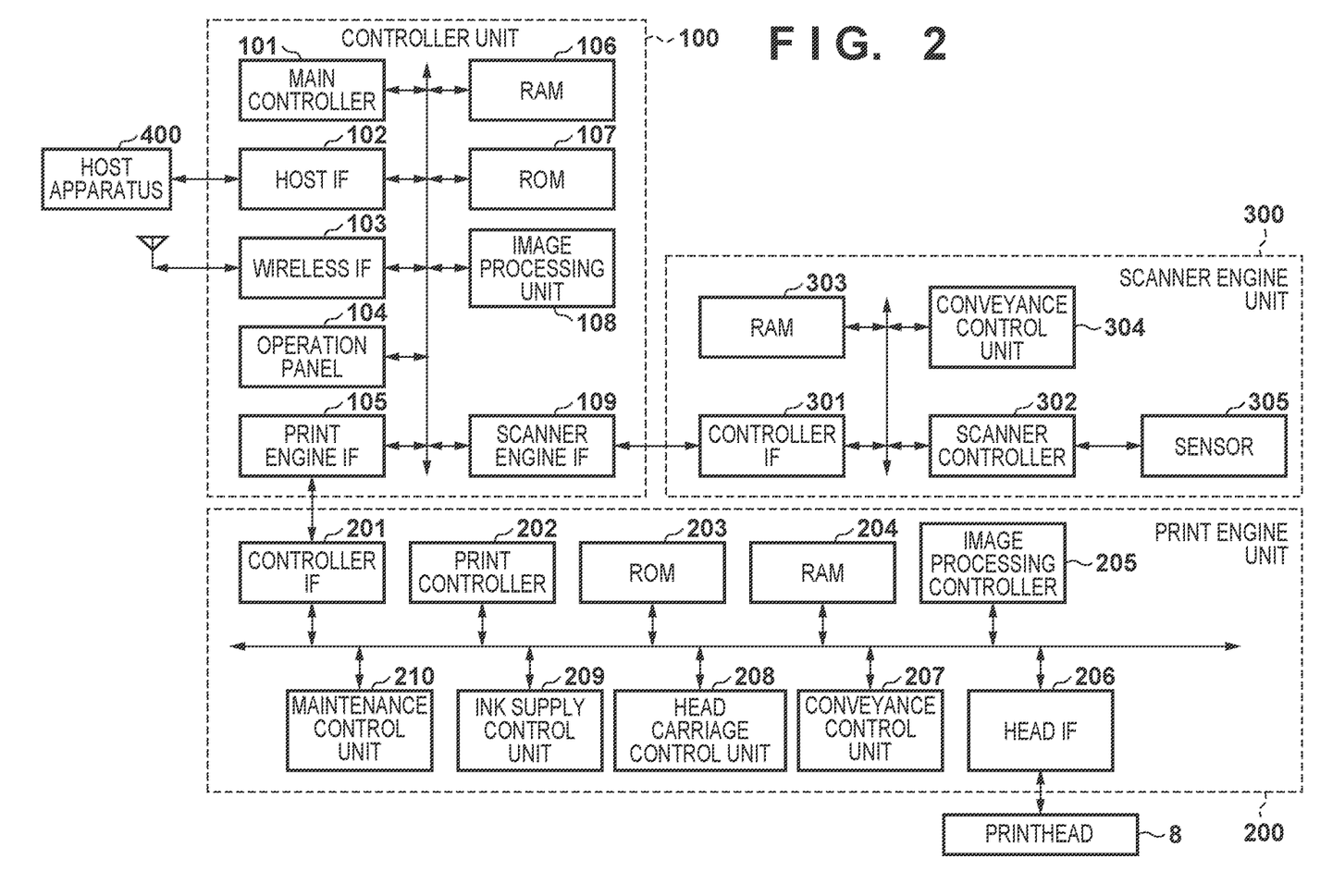
FIG. 2 is a block diagram showing an example of the system configuration of the printing apparatus 1.

FIG. 2 is a block diagram showing an example of the system configuration of the printing apparatus 1. The printing apparatus 1 includes a print engine unit 200 that controls driving of the print unit 2, a scanner engine unit 300 that controls driving of the scanner unit 3, and a controller unit 100 that controls the entire system of the printing apparatus 1.

The controller unit 100 includes a main controller 101, a host IF 102, a wireless IF 103, an operation panel 104, a print engine IF 105, a Random Access Memory (RAM) 106, a Read Only Memory (ROM) 107, an image processing unit 108, and a scanner engine IF 109. Note that in this specification, IF refers to interface, and may be described as I/F.

The print engine unit 200 includes a controller IF 201, the print controller 202, a ROM 203, a RAM 204, an image processing controller 205, a head IF 206, a conveyance control unit 207, a head carriage control unit 208, an ink supply control unit 209, and a maintenance control unit 210. Each component of the print engine unit 200 is controlled by the print controller 202 based on an instruction from the main controller 101 of the controller unit 100.

The scanner engine unit 300 includes a controller IF 301, a scanner controller 302, a RAM 303, a conveyance control unit 304, and a sensor 305. Each component of the scanner engine unit 300 is controlled based on an instruction from the main controller 101 of the controller unit 100.

In the controller unit 100, the main controller 101 is formed by a Central Processing Unit (CPU), and controls driving of the entire printing apparatus 1 by executing a program read out from the ROM 107 while using the RAM 106 as a work area. For example, when a print job is input from a host apparatus 400 via the host I/F 102 or the wireless I/F 103, predetermined image processing can be performed on the image data received by the image processing unit 108. The image data can be transmitted by the main controller 101 to the print engine unit 200 via the print engine I/F 105.

The printing apparatus 1 may acquire image data from the host apparatus 400 via wireless communication or wired communication, or may acquire image data from an external storage apparatus (USB memory or the like) connected to the printing apparatus 1. Known communication methods may be used for the wireless communication and wired communication. Examples of the wireless communication are Wi-Fi (Wireless Fidelity)®, Bluetooth®, and the like. Examples of the wired communication are Universal Serial Bus (USB) and the like.

When a reading instruction is input from the host apparatus 400 to the printing apparatus 1, the main controller 101 transmits a control signal based on the reading instruction to the scanner unit 3 via the scanner engine I/F 109.

The operation panel 104 accepts an operation input to the printing apparatus 1 made by the user. For example, the user can input a print instruction, a scan instruction, a copy instruction, or the like via the operation panel 104. Prior to this, the user can set or change the operation mode, or check the setting information of the printing apparatus 1. The operation panel 104 may be a touch panel display. In this case, the response result with respect to the operation input can be displayed.

In the print engine unit 200, the print controller 202 is formed by a CPU, and controls driving of each component of the print unit 2 by executing a program read out from the ROM 203 while using the RAM 204 as a work area. Image data and various kinds of commands received via the controller I/F 201 can be temporarily saved in the RAM 204 by the print controller 202. The print controller 202 causes the image processing controller 205 to convert the image data into printing data usable by the printhead 8 upon executing a printing operation. After that, the print controller 202 causes, via the head I/F 206, the printhead 8 to execute a printing operation based on the printing data. At this time, the print controller 202 conveys the paper sheet by driving or controlling the feeding units 6A and 6B, the conveyance rollers 7, the discharge rollers 12, and the flapper 11 via the conveyance control unit 207. In this manner, the printing operation by the printhead 8 is executed together with the conveyance operation of the paper sheet. Thus, a printing process can be performed.

The head carriage control unit 208 changes the posture (such as the orientation or the position) of the printhead 8 based on the operation state (such as the printing state or the maintenance state) of the printing apparatus 1. The ink supply control unit 209 controls the ink supply unit 15 such that the pressure of ink supplied to the printhead 8 falls within a predetermined range. The maintenance control unit 210 controls driving of the cap unit 10 and the wiping unit 17 of the maintenance unit 16 during the maintenance operation of the printhead 8.

In the scanner engine unit 300, the main controller 101 controls respective components of the scanner controller 302 based on programs and various kinds of parameters stored in the ROM 107 while using the RAM 106 as a work area. Thus, the respective components of the scanner unit 3 are controlled. For example, by the main controller 101 controlling the respective components of the scanner controller 302 via the controller I/F 301, a document placed on the ADF by the user is conveyed by the conveyance control unit 304, and the sensor 305 reads an image from the document. The read image data can be temporarily saved in the RAM 303 by the scanner controller 302. Note that the print controller 202 can convert the image data obtained as described above into printing data, and cause the printhead 8 to execute a printing operation based on the image data.

Figure 3:
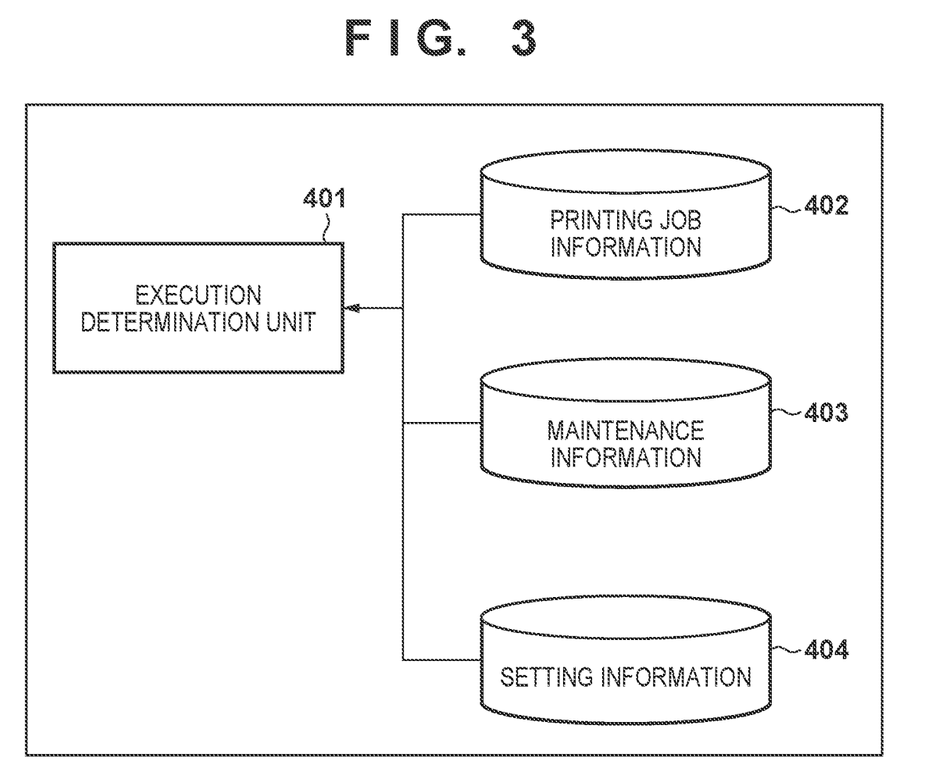
FIG. 3 is a view showing an example of the software configuration corresponding to a program.

FIG. 3 shows an example of the software configuration corresponding to a program stored in the ROM 107. An execution determination unit 401 acquires printing job information 402, maintenance information 403, and setting information 404. If a printing job is accepted during execution of maintenance, the execution determination unit 401 determines whether to continue execution of the maintenance or to interrupt the maintenance and perform the printing process of the accepted printing job. The details of the determination will be described later.

The printing job information 402 includes attribute information indicating the kind of the printing job such as a print job, a copy job, or a FAX reception job, color information indicating color printing or monochrome printing, and the like.

The maintenance information 403 includes time information indicating the execution time of the maintenance, elapse information indicating the elapsed time from the completion of the previous maintenance, and interruption propriety information indicating whether the maintenance being executed can be interrupted. The time information indicates the time required from the start to the completion of execution of the maintenance, the time from the start to the interruption of execution of the maintenance, and the remaining time until the completion of the maintenance being executed. Note that if the maintenance is interrupted two or more times, the time from the start to the interruption of execution of the maintenance indicates the accumulated time of the maintenance executed from the start to the last interruption of execution of the maintenance. The elapse information indicates the number of printed sheets by printing jobs since the completion of execution of the previous maintenance, and the elapsed time since the completion of execution of the previous maintenance.

The setting information 404 includes information indicating setting of a threshold value (threshold value setting information), information indicating setting of an allowable time (allowable time setting information), and information indicating whether to prioritize maintenance or a job (priority setting information). The threshold value is a criterion value to be referred to, which is set in advance for the remaining time until the completion of the maintenance being executed. The threshold value may be set at the manufacturing factory during the manufacture of the printing apparatus 1, or may be set by the user. The allowable time is the time indicating whether the time from the start to the interruption of execution of the maintenance is allowable. The allowable time can be set by the user in accordance with the kind of maintenance. The priority setting information can be set by the user for each combination of the kind of job and color information.

Examples of the kinds of maintenance are capping processing, wiping processing, and stirring processing. Capping processing caps the nozzle surface 8a of the printhead 8 with the cap unit 10, thereby preventing drying of ink during a period in which the printing operation is not executed. Wiping processing cleans the nozzle surface 8a of the printhead 8 by the wiping unit 17, thereby removing nozzle clogging and preventing air bubbles from entering the ink channel. Stirring processing stirs, by the ink supply unit 15, the ink supplied from the ink tank unit 14 and the ink collected from the printhead 8, thereby adjusting the liquid components in the ink such that the ink can be properly discharged from the nozzles. The maintenance unit 16 controls driving of each of the cap unit 10, the wiping unit 17, and the printhead 8 at a predetermined timing. For example, the execution timing, the time required from the start to the completion of execution, and the interruption propriety of the maintenance after the start of execution change depending on the kind of maintenance.

Note that the above-described maintenance is executed based on holding of a predetermined condition. For example, the maintenance can be executed if the elapsed time from the completion of execution of the previous maintenance meets a criterion, if the number of executed printing operations, the printing amount (for example, ink discharge amount), or the like meets a criterion, or the like.

First Embodiment

In the first embodiment, an execution determination unit 401 uses the threshold value setting information in setting information 404 to determine whether to continue execution of the maintenance or to interrupt the maintenance and perform the printing process of the accepted printing job.

Figure 4:
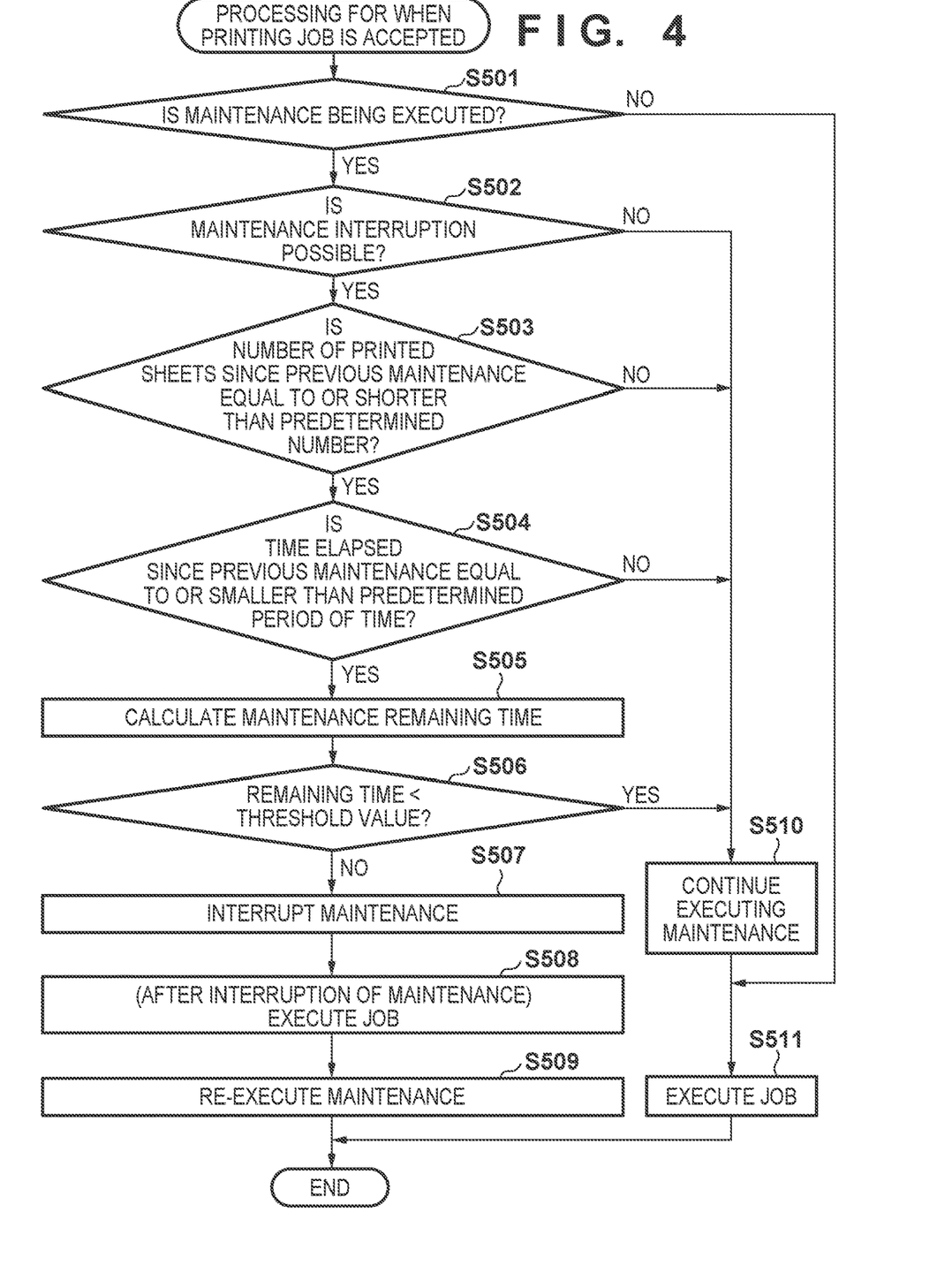
FIG. 4 is a flowchart showing an example of the processing contents of an execution determination unit 401.

FIG. 4 is a flowchart showing an example of the processing contents according to this embodiment in a case in which the execution determination unit 401 accepts a printing job.

In step S501, the execution determination unit 401 performs determination processing of determining, based on maintenance information 403, whether maintenance is being executed. If maintenance is being executed, the execution determination unit 401 advances to processing in step S502; otherwise, the execution determination unit 401 advances to processing in step S511.

In step S502, the execution determination unit 401 performs determination processing of determining whether the maintenance being executed can be interrupted. Some maintenance includes a test for specifying the nozzle having difficulty in proper discharge, cleaning of the printhead 8, or the like. Depending on the kind of maintenance, some maintenance can be interrupted, and another kind of maintenance should not be interrupted. If the maintenance can be interrupted, the execution determination unit 401 advances to processing in step S503; otherwise, the execution determination unit 401 advances to processing in step S510.

In step S503, the execution determination unit 401 performs determination processing of determining whether the number of printed sheets by printing jobs since the completion of execution of the previous maintenance is equal to or smaller than a criterion. This determination criterion can change depending on the kind of maintenance. By performing maintenance while appropriately setting the determination criterion, the quality of the printing operation can be maintained, and apparatus maintenance and the like become possible. Note that this criterion may be the number of printed sheets by printing jobs, or may be the dot count (the number of ink discharge dots). If the number of printed sheets by printing jobs since the completion of execution of the previous maintenance is equal to or smaller than the criterion, the execution determination unit 401 advances to processing in step S504; otherwise, the execution determination unit 401 advances to processing in step S510.

In step S504, the execution determination unit 401 performs determination processing of determining whether the elapsed time from the completion of execution of the previous maintenance is equal to or shorter than a criterion. This determination criterion can change depending on the kind of maintenance. By performing maintenance while appropriately setting the determination criterion, the quality of the printing operation can be maintained, and apparatus maintenance and the like become possible. If the elapsed time from the completion of execution of the previous maintenance is equal to or shorter than the criterion, the execution determination unit 401 advances to processing in step S505; otherwise, the execution determination unit 401 advances to processing in step S510.

Note that the determinations in steps S502, S503, and S504 may be collectively performed in a single step. The order of steps S502, S503, and S504 may be changed.

In step S505, the execution determination unit 401 calculates the remaining time until the completion of the maintenance being executed.

In step S506, the execution determination unit 401 performs determination processing of determining whether to interrupt the maintenance being executed. This determination is performed by comparing the remaining time until the completion of the maintenance being executed, which is calculated in step S505, with the threshold value indicated by the threshold value setting information in the setting information 404. If the remaining time is shorter than the threshold value, the execution determination unit 401 advances to processing in step S510; otherwise, the execution determination unit 401 advances to processing in step S507.

In step S507, the execution determination unit 401 performs interruption processing of interrupting the maintenance being executed.

In step S508, in response to the completion of the interruption processing in step S507, the execution determination unit 401 performs the printing process of the printing job.

In step S509, in response to the completion of the printing process in step S508, the execution determination unit 401 restarts execution of the maintenance interrupted in step S507.

In step S510, the execution determination unit 401 continues the maintenance being executed.

In step S511, the execution determination unit 401 performs the printing process of the printing job.

FIGS. 5A to 5D show examples of the processing results of the execution determination unit 401.

Figure 5A:
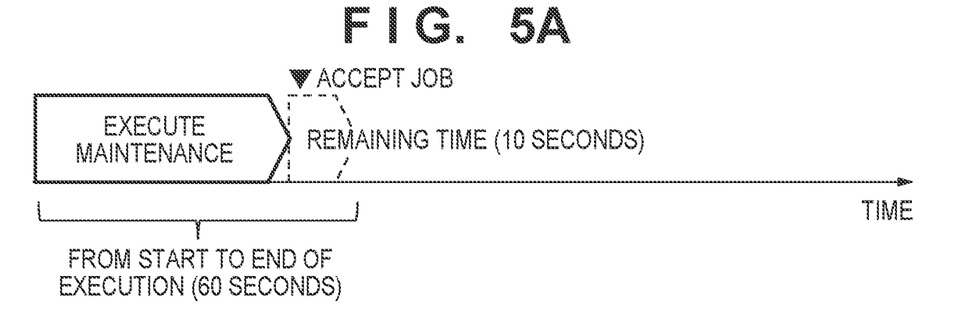
FIG. 5A is a view showing an example of the processing result of the execution determination unit 401.

FIG. 5A shows the execution mode of the maintenance in a case in which the process advances up to step S505 after a job is accepted during execution of the maintenance. In the maintenance that requires 60 sec from the start to the completion of execution, if the job is accepted after 50 sec has elapsed since the start of execution of the maintenance, the remaining time until the completion of the maintenance is 10 sec.

Figure 5B:
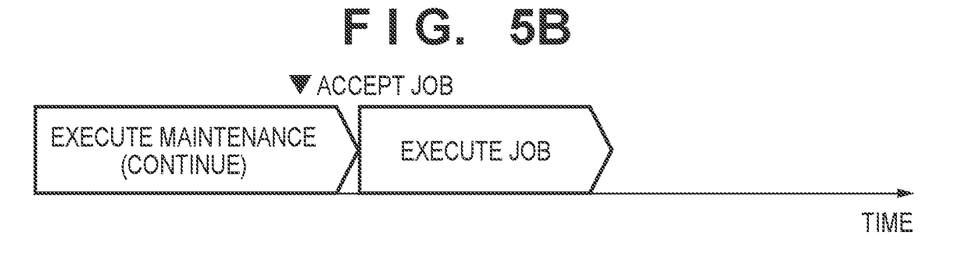
FIG. 5B is a view showing an example of the processing result of the execution determination unit 401.

FIG. 5B shows the execution mode of the maintenance in a case in which the process advances up to step S510 based on the determination in step S506. For example, if the threshold value is set to 20% the time required from the start to the completion of execution of the maintenance, the threshold value for the maintenance that requires 60 sec from the start to the completion of execution is 12 sec. In this example in which the remaining time until the completion of the maintenance is 10 sec, the remaining time is shorter than the threshold value. Accordingly, the execution determination unit 401 continues to execute the maintenance being executed, and performs the printing process of the job after execution of the maintenance is complete.

Figure 5C:
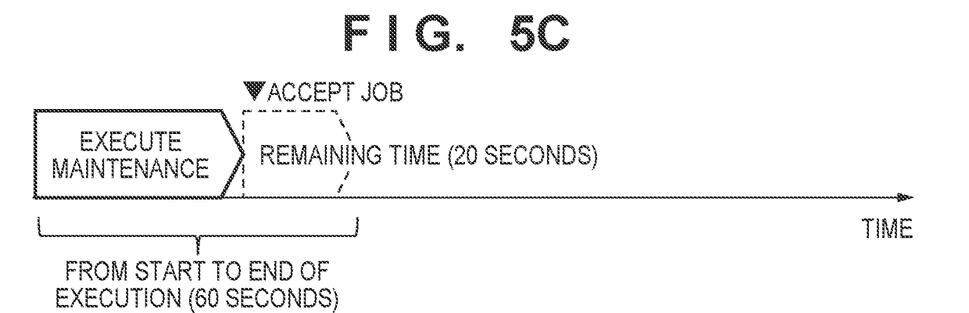
FIG. 5C is a view showing an example of the processing result of the execution determination unit 401.

FIG. 5C shows the execution mode of the maintenance in a case in which the process advances up to step S505 after a job is accepted during execution of the maintenance. In the maintenance that requires 60 sec from the start to the completion of execution, if the job is accepted after 40 sec has elapsed since the start of execution of the maintenance, the remaining time until the completion of the maintenance is 20 sec.

Figure 5D:
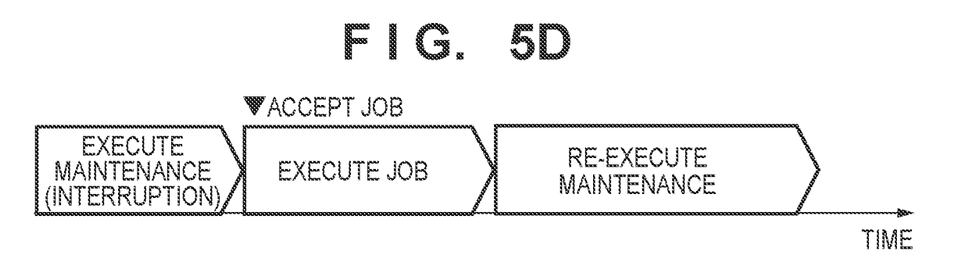
FIG. 5D is a view showing an example of the processing result of the execution determination unit 401.

FIG. 5D shows the execution mode of the maintenance in a case in which the process advances up to step S507 based on the determination in step S506. For example, if the threshold value is set to 20% the time required from the start to the completion of execution of the maintenance, the threshold value for the maintenance that requires 60 sec from the start to the completion of execution is 12 sec. In this example in which the remaining time until the completion of the maintenance is 20 sec, the remaining time is longer than the threshold value. Accordingly, the execution determination unit 401 interrupts the maintenance being executed and performs the printing process of the job. After that, the execution determination unit 401 restarts the interrupted maintenance.

According to this embodiment, if a job is accepted during execution of maintenance, it is determined, based on the remaining time until the completion of the maintenance being executed, whether to continue execution of the maintenance or to interrupt the maintenance and perform the printing process of the accepted printing job. According to such the control mode, the printing process of the printing job is appropriately executed in accordance with the acceptance timing of the printing job, and this is advantageous in improving usability. For example, if it is continued to execute the maintenance, the total time of the maintenance execution time and the job processing time can be shortened. If the maintenance is interrupted and the printing process of the accepted printing job is performed, downtime in the printing job due to execution of the maintenance can be reduced.

Second Embodiment

In the second embodiment, an execution determination unit 401 uses allowable time setting information in setting information 404 to determine whether to continue execution of the maintenance or to interrupt the maintenance and perform the printing process of the accepted printing job.

Figure 6:
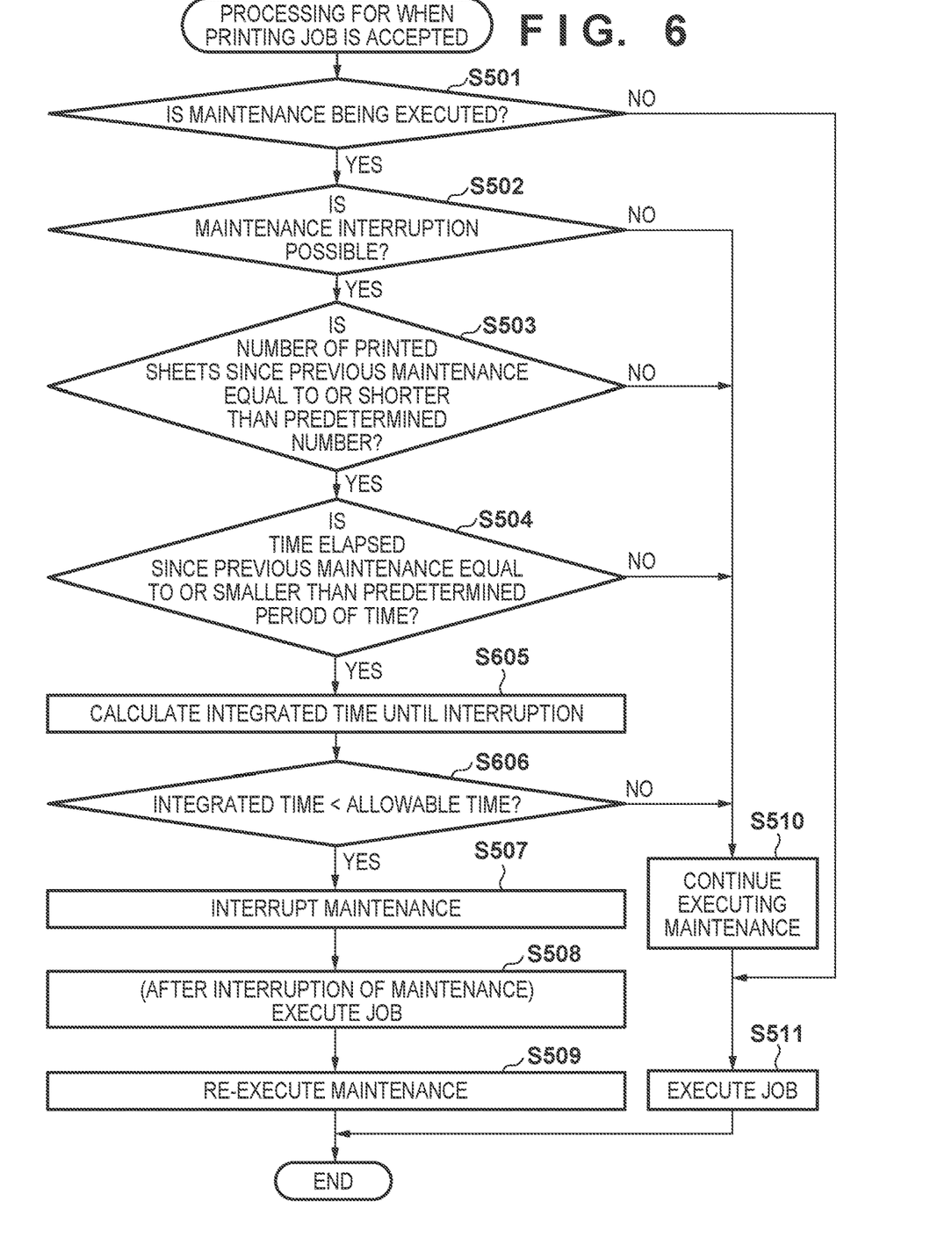
FIG. 6 is a flowchart showing another example of the processing contents of the execution determination unit 401.

FIG. 6 is a flowchart showing an example of the processing contents according to this embodiment in a case in which the execution determination unit 401 accepts a printing job (note that steps S501 to S504 and S507 to S511 in FIG. 6 are similar to those described with reference to FIG. 4).

In step S605, the execution determination unit 401 calculates the time from the start to the interruption of execution of the maintenance (if the maintenance is interrupted two or more times, the accumulated time of the maintenance from the start to the last interruption of execution of the maintenance).

In step S606, the execution determination unit 401 performs determination processing of determining whether to interrupt the maintenance being executed. This determination is performed by comparing the time from the start to the interruption of execution of the maintenance calculated in step S605 with the allowable time indicated by the allowable time setting information in the setting information 404. If the time from the start to the interruption of execution of the maintenance is shorter than the allowable time, the execution determination unit 401 advances to processing in step S507; otherwise, the execution determination unit 401 advances to processing in step S510.

FIGS. 7A to 7D show examples of the processing results of the execution determination unit 401.

Figure 7A:
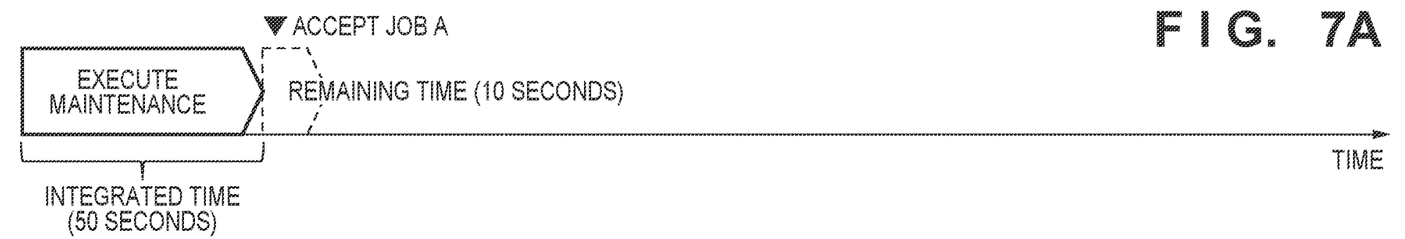
FIG. 7A is a view showing another example of the processing result of the execution determination unit 401.

FIG. 7A shows the execution mode of the maintenance in a case in which the process advances up to step S605 after a job A is accepted during execution of the maintenance. In the maintenance that requires 60 sec from the start to the completion of execution, if the job A is accepted after 50 sec has elapsed since the start of execution of the maintenance, the time from the start to the interruption of execution of the maintenance is 50 sec.

Figure 7B:
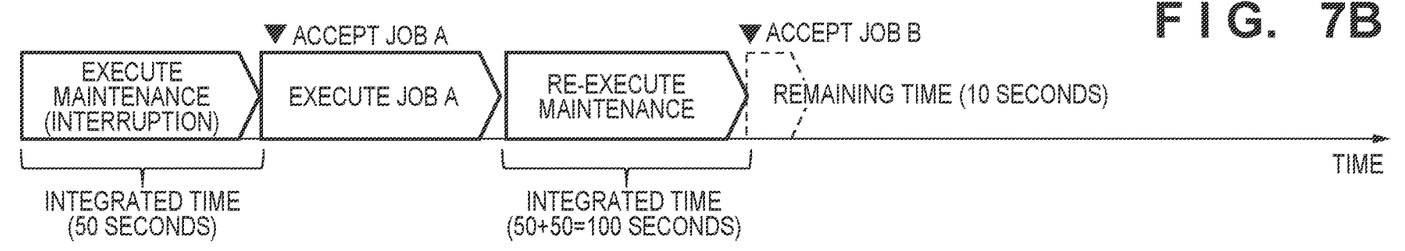
FIG. 7B is a view showing another example of the processing result of the execution determination unit 401.

FIG. 7B shows the execution mode of the maintenance in a case in which the process advances up to step S507 based on the determination in step S606, then a job B is accepted during execution of the restarted maintenance, and the process advances again from step S501 up to step S605. For example, if the job B is accepted after 50 sec has elapsed since the restart of the maintenance, the time (accumulated time) from the start to the interruption of execution of the maintenance is 100 sec.

Figure 7C:
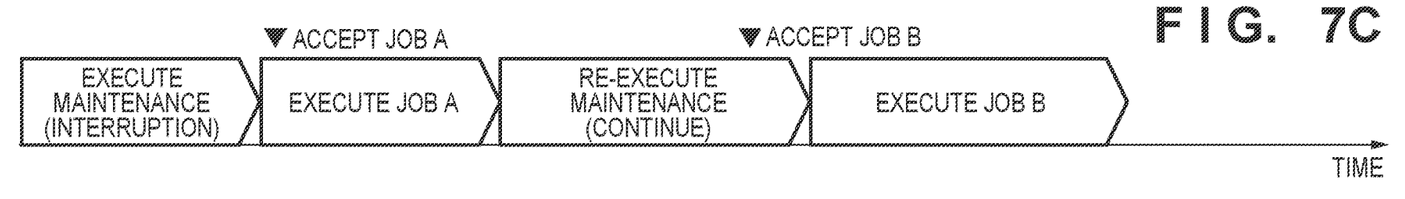
FIG. 7C is a view showing another example of the processing result of the execution determination unit 401.

FIG. 7C shows the execution mode of the maintenance in a case in which the job B is accepted during execution of the restarted maintenance and the process advances to step S510 based on the determination in step S606. For example, if the allowable time is set to 60 sec, the time from the start to the interruption of execution of the maintenance (accumulated time of 100 sec) is longer than the allowable time. Accordingly, the execution determination unit 401 continues to execute the restarted maintenance, and performs the printing process of the job B after execution of the maintenance is complete.

Figure 7D:
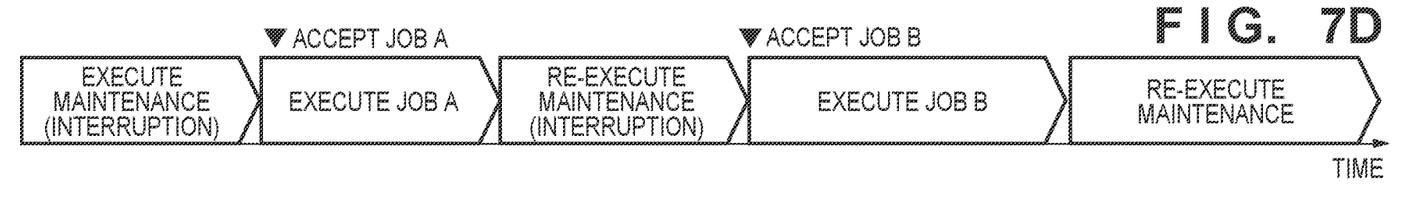
FIG. 7D is a view showing another example of the processing result of the execution determination unit 401.

FIG. 7D shows the execution mode of the maintenance in a case in which the job B is accepted during execution of the restarted maintenance, and the process advances to processing in step S507 based on the determination in step S606. For example, if the allowable time is set to 120 sec, the time from the start to the interruption of execution of the maintenance (accumulated time of 100 sec) is shorter than the allowable time. Accordingly, the execution determination unit 401 interrupts the restarted maintenance and performs the printing process of the job B. After that, the execution determination unit 401 restarts the interrupted maintenance.

Figure 8:
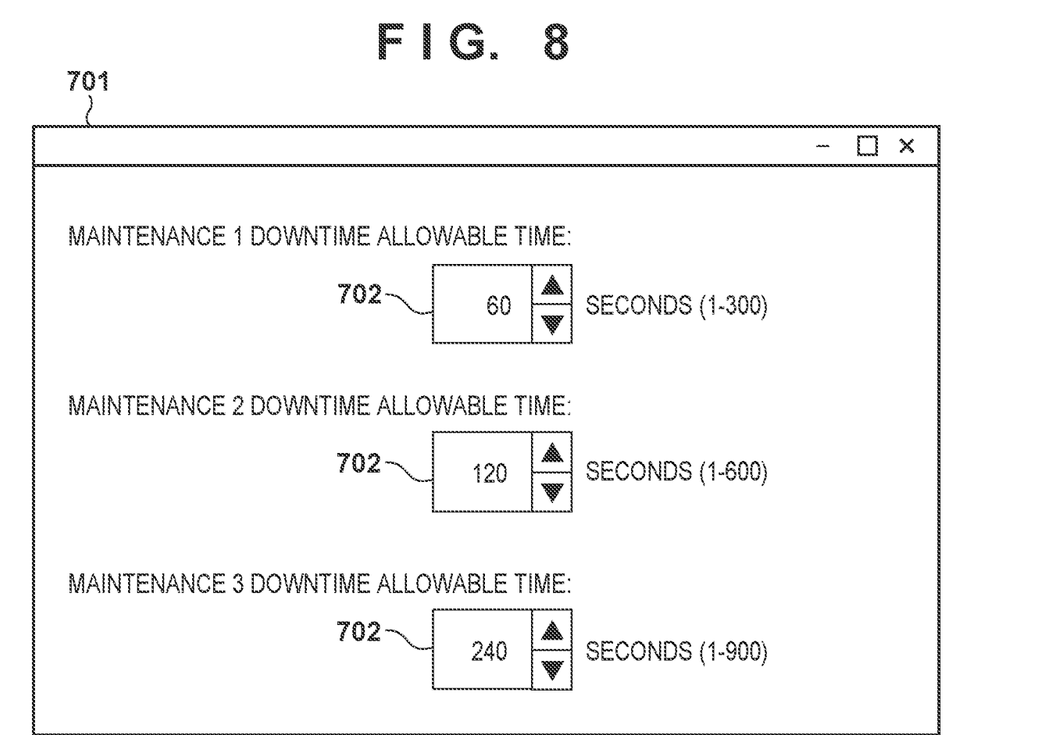
FIG. 8 is a view showing display information 701 for setting an allowable time.

FIG. 8 shows display information 701 as an example of the display used by the user to set the allowable time in a printing apparatus 1. The display information 701 can be displayed on an operation panel 104. The display information 701 includes one or more pieces of information 702 that can be used to set or change the allowable time. By providing the information 702 for each kind of maintenance, the allowable time can be set or changed for each kind of maintenance. The upper limit value of the allowable time can also be changed for each kind of maintenance. For example, in stirring processing, it can have influence not on apparatus maintenance but on maintaining the quality of the printing operation, so that the upper limit value of the allowable time can be set high. On the other hand, in wiping processing, it has large influence on apparatus maintenance, so that the upper limit value of the allowable time can be set low.

According to this embodiment, if a job is accepted during execution of maintenance, it is determined, based on the time from the start to the interruption of execution of the maintenance, whether to continue execution of the maintenance or to interrupt the maintenance and perform the printing process of the accepted printing job. According to such the control mode, in addition to obtaining an effect similar to that of the first embodiment, it can be avoided that the maintenance is continued to be interrupted in a case in which, for example, a plurality of printing jobs are continuously input.

Third Embodiment

In the third embodiment, an execution determination unit 401 uses priority setting information in setting information 404 to determine whether to continue execution of the maintenance or to interrupt the maintenance and perform the printing process of the accepted printing job.

Figure 9:
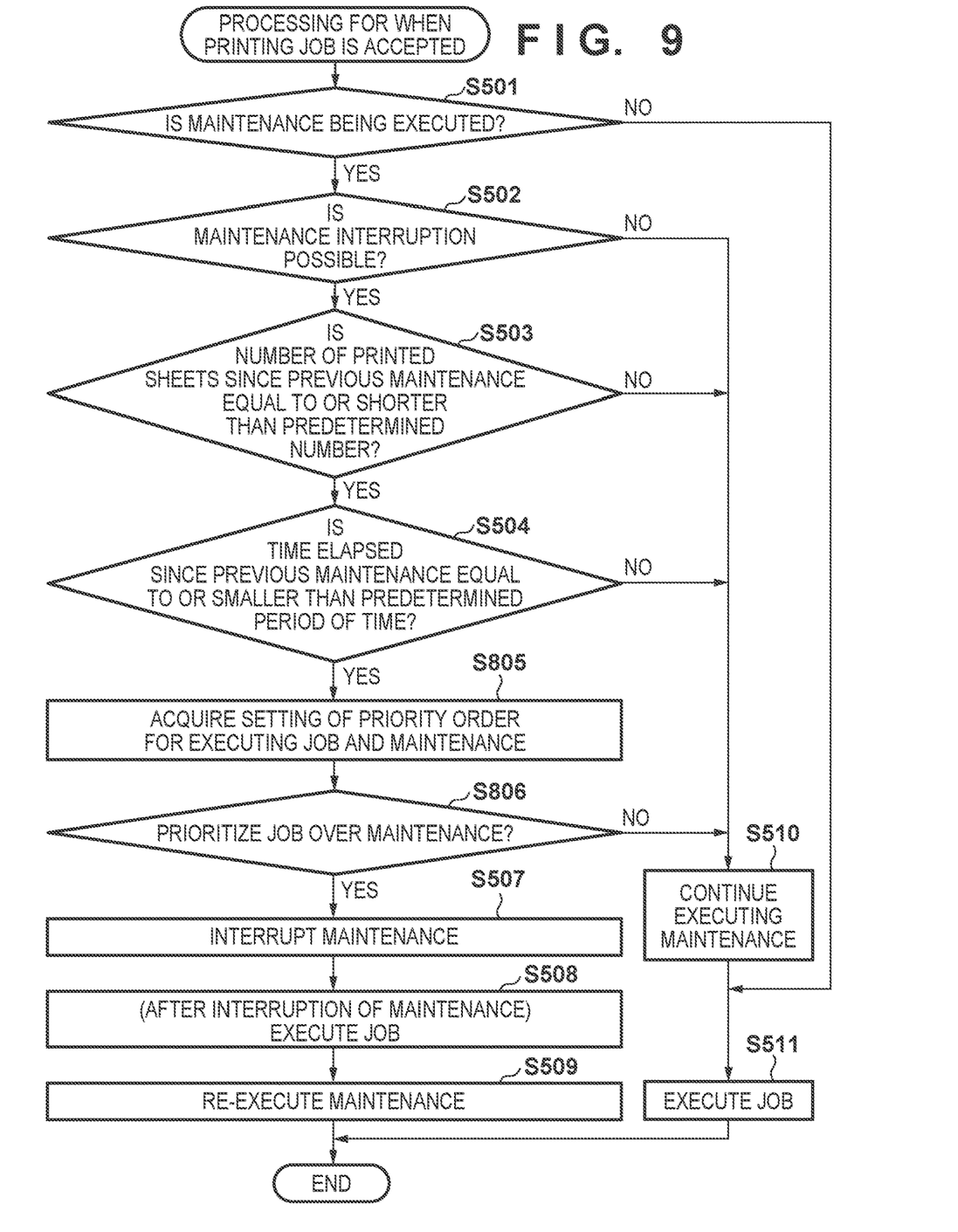
FIG. 9 is a flowchart showing another example of the processing contents of the execution determination unit 401.

FIG. 9 is a flowchart showing an example of the processing contents according to this embodiment in a case in which the execution determination unit 401 accepts a printing job (note that steps S501 to S504 and S507 to S511 in FIG. 9 are similar to those described with reference to FIG. 4).

In step S805, the execution determination unit 401 acquires priority setting information from the setting information 404.

In step S806, the execution determination unit 401 performs determination processing of determining whether to interrupt the maintenance being executed. This determination is performed based on whether the setting information acquired in step S805 indicates to prioritize maintenance or to prioritize a job. If maintenance is prioritized, the execution determination unit 401 advances to processing in step S510. If a job is prioritized, the execution determination unit 401 advances to processing in step S507.

Figure 10:
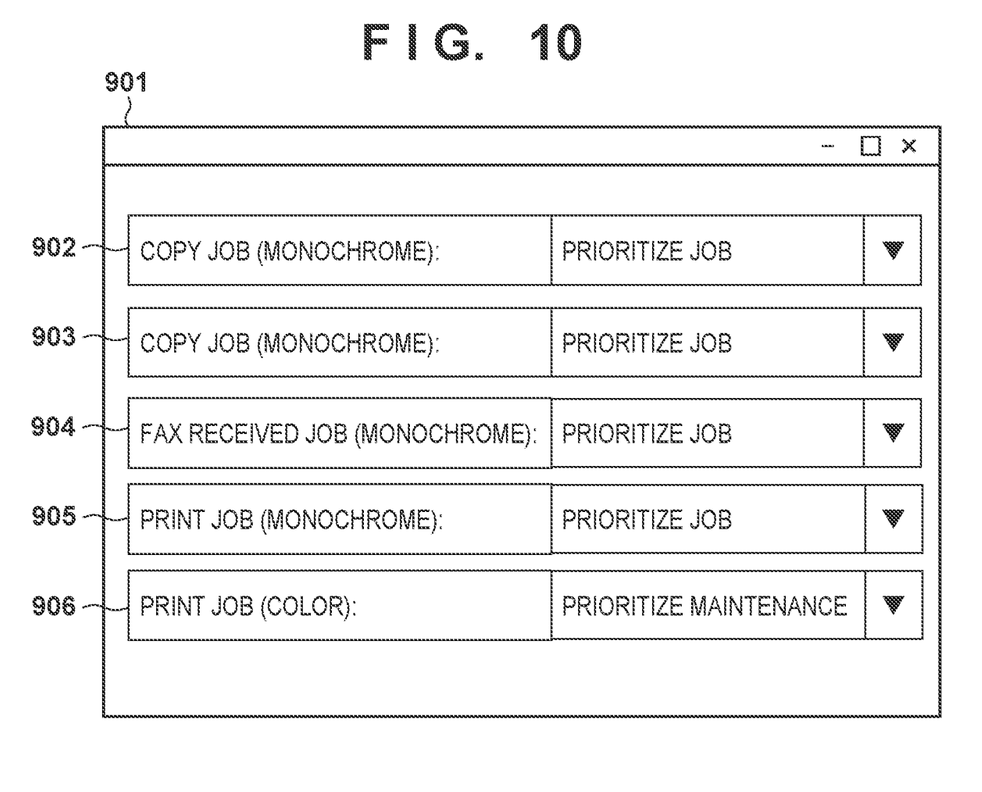
FIG. 10 is a view showing display information 901 for setting whether to prioritize maintenance or a job.

FIG. 10 shows display information 901 as an example of the display used to set whether to prioritize maintenance or a job in a printing apparatus 1. The display information 901 can be displayed on an operation panel 104. The display information 901 can be set for each combination of the kind of job and color information. For example, setting information 902 is setting information in a monochrome printing copy job. Setting information 903 is setting information in a color printing copy job. Setting information 904 is setting information in a monochrome printing FAX reception job. Setting information 905 is setting information in a monochrome printing print job. Setting information 906 is setting information in a color printing print job.

Figure 11A:
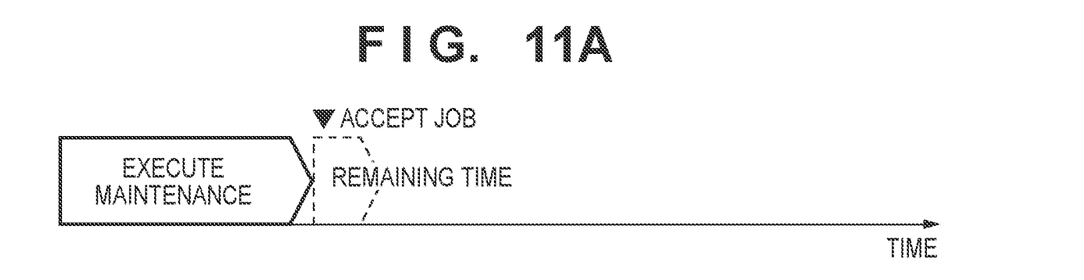
FIG. 11A is a view showing another example of the processing result of the execution determination unit 401.
Figure 11B:
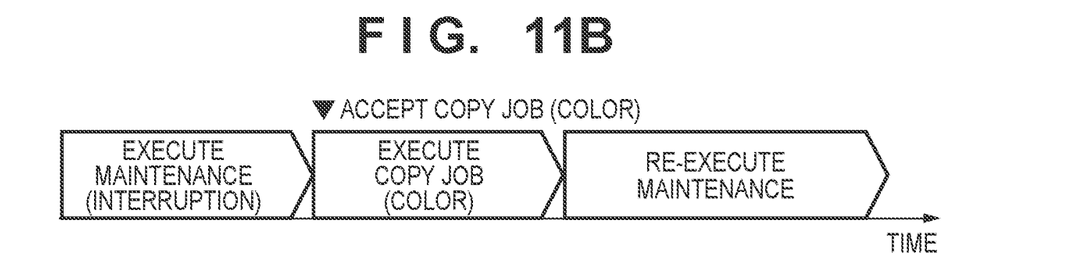
FIG. 11B is a view showing another example of the processing result of the execution determination unit 401.
Figure 11C:
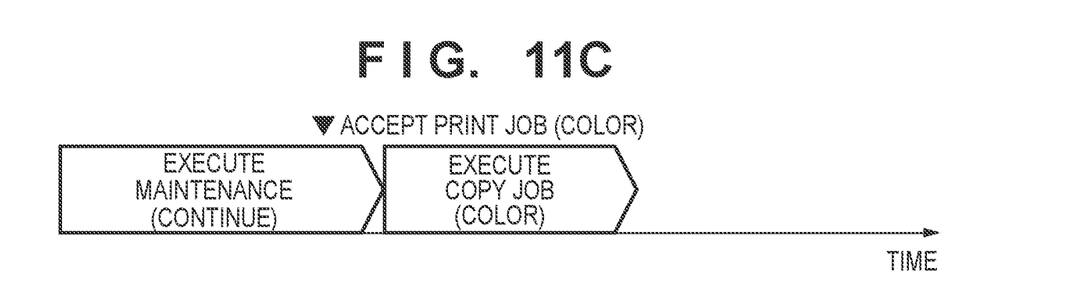
FIG. 11C is a view showing another example of the processing result of the execution determination unit 401.

FIGS. 11A to 11C show examples of processing results of the execution determination unit 401.

FIG. 11A shows the execution mode of the maintenance in a case in which a job is accepted during execution of the maintenance and the process advances up to step S805.

FIG. 11B shows the execution mode of the maintenance in a case in which the process advances up to step S507 based on the determination in step S806. As exemplarily shown in FIG. 10, since the setting information in a color printing copy job is set to prioritize a job, the execution determination unit 401 interrupts the maintenance being executed, and performs the printing process of the job. After that, the execution determination unit 401 restarts the interrupted maintenance.

FIG. 11C shows the execution mode of the maintenance in a case in which the process advances up to step S507 based on the determination in step S806. As exemplarily shown in FIG. 10, since the setting information in a color printing print job is set to prioritize maintenance, the execution determination unit 401 continues to execute the maintenance being executed, and performs the printing process of the job after execution of the maintenance is complete.

According to this embodiment, by determining, for each kind of job, whether to prioritize the maintenance or the job, it is possible to prioritize the printing process of the copy job over the maintenance. According to such the control mode, an effect similar to that of the first embodiment can also be obtained.

According to the above embodiments, if an instruction of a printing operation is accepted during execution of a maintenance operation, the printing apparatus 1 determines whether to interrupt the maintenance operation and start the printing operation or to start the printing operation after the maintenance operation is complete. According to such control mode, the printing operation is appropriately executed in accordance with the acceptance timing of the instruction of the printing operation, and this is advantageous in improving usability.

(Others)

In the above description, the printing apparatus 1 using an inkjet printing method has been described as an example. However, the printing method is not limited to the above-described mode. Further, the printing apparatus 1 may be a single-function printer having only a printing function, or may be a multi-function printer having a plurality of functions such as a printing function, a FAX function, and a scanner function. In addition, the printing apparatus 1 may be a manufacturing apparatus for manufacturing, for example, a color filter, an electronic device, an optical device, a microstructure, or the like using a predetermined printing method.

The term "printing" in this specification should be interpreted in a broad sense. Accordingly, the mode of "printing" does not matter whether the object formed on a print medium is significant information such as characters and graphics, and also does not matter whether the object is visualized so that a human can visually perceive it.

Further, "print medium" should be interpreted in a broad sense, similar to "printing" described above. The concept of "print medium" can include, in addition to paper which is generally used, any member that can accept ink, such as cloth, a plastic film, a metal plate, glass, ceramics, a resin, wood, leather, and the like.

Furthermore, "ink" should be interpreted in a broad sense, similar to "printing" described above. Accordingly, the concept of "ink" can include, in addition to a liquid that forms an image, a figure, a pattern, or the like by being applied onto a print medium, additional liquids that can be used for processing a print medium, processing ink (for example, coagulation or insolubilization of colorants in ink applied onto a print medium), or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081720, filed May 18, 2022, which is hereby incorporated by reference herein in its entirety.

What is claimed is:

1. A printing apparatus capable of executing a printing operation of performing printing using a printhead and a predetermined maintenance operation, the printing apparatus comprising at least one memory and at least one processor and/or at least one circuit which function as:

an acceptance unit configured to accept a start instruction of the printing operation; and a control unit configured to perform a control, in a case where the instruction is accepted during execution of the maintenance operation and a specific condition is satisfied, to interrupt the maintenance operation and start the printing operation, wherein the specific condition includes that an accumulated time from a start of the maintenance operation to an interruption of the maintenance operation is shorter than a threshold value, and in a case where the instruction is accepted during execution of the maintenance operation and the specific condition is not satisfied, to start the printing operation after the maintenance operation is complete, wherein the specific condition includes a first condition where the maintenance operation is one of a type which should not be interrupted, a second condition where the number of printed sheets since a completion of the previous maintenance operation is equal to or smaller than a criterion, and a third condition where the elapsed time from the completion of the previous maintenance operation is equal to or shorter than a criterion, in a case where all of the first to third conditions are satisfied and the accumulated time is shorter than the threshold value, the control unit interrupts the maintenance operation and starts the printing operation, and in a case where any one of the first to third condition is not satisfied, the control unit starts the printing operation after the maintenance operation is complete, regardless of whether the accumulated time is shorter than the threshold value.

2. The printing apparatus according to claim 1, wherein the maintenance operation includes a first maintenance operation and a second maintenance operation, and the threshold value is set for each of the first maintenance operation and the second maintenance operation.

3. The printing apparatus according to claim 1, wherein the at least one memory and the at least one processor and/or the at least one circuit further function as:

a calculation unit configured to calculate the accumulated time.

4. The printing apparatus according to claim 1, wherein in a case where the instruction is accepted during execution of the maintenance operation and the accumulated time is not shorter than the threshold value, the control unit starts the printing operation after the maintenance operation is complete.

5. The printing apparatus according to claim 1, wherein the specific condition includes a first condition where the maintenance operation is one of a type which should not be interrupted, and in a case where the first condition is not satisfied, the control unit starts the printing operation after the maintenance operation is complete, regardless of whether the accumulated time is shorter than the threshold value.

6. The printing apparatus according to claim 1, wherein the specific condition includes a second condition where the number of printed sheets since a completion of the previous maintenance operation is equal to or smaller than a criterion, and in a case where the second condition is not satisfied, the control unit starts the printing operation after the maintenance operation is complete, regardless of whether the accumulated time is shorter than the threshold value.

7. The printing apparatus according to claim 1, wherein the specific condition includes a third condition where the elapsed time from the completion of the previous maintenance operation is equal to or shorter than a criterion, and in a case where the third condition is not satisfied, the control unit starts the printing operation after the maintenance operation is complete, regardless of whether the accumulated time is shorter than the threshold value.

8. The printing apparatus according to claim 1, wherein the printing operation is performed in an inkjet printing method.

9. The printing apparatus according to claim 1, wherein the maintenance operation is at least one of:

a capping processing for capping the printhead to prevent drying of ink, a wiping processing for cleaning a nozzle surface of the printhead to prevent air bubbles from entering an ink channel, and a stirring processing for stirring ink.

10. A control method of a printing apparatus capable of executing a printing operation of performing printing using a printhead and a predetermined maintenance operation, the method comprising:

accepting a start instruction of the printing operation; and performing a control, in a case where the instruction is accepted during execution of the maintenance operation is satisfied, to interrupt the maintenance operation and start the printing operation, wherein the specific condition includes that an accumulated time from a start of the maintenance operation to an interruption of the maintenance operation is shorter than a threshold value, and in a case where the instruction is accepted during execution of the maintenance operation and the specific condition is not satisfied, to start the printing operation after the maintenance operation is complete, wherein the specific condition includes a first condition where the maintenance operation is one of a type which should not be interrupted, a second condition where the number of printed sheets since a completion of the previous maintenance operation is equal to or smaller than a criterion, and a third condition where the elapsed time from the completion of the previous maintenance operation is equal to or shorter than a criterion, in a case where all of the first to third conditions are satisfied and the accumulated time is shorter than the threshold value, the control unit interrupts the maintenance operation and starts the printing operation, and in a case where any one of the first to third condition is not satisfied, the control unit starts the printing operation after the maintenance operation is complete, regardless of whether the accumulated time is shorter than the threshold value.

11. A non-transitory computer-readable storage medium storing a program for a printing apparatus capable of executing a printing operation of performing printing using a printhead and a predetermined maintenance operation, the program configured to cause a computer to:

accept a start instruction of the printing operation; and perform a control, in a case where the instruction is accepted during execution of the maintenance operation and a specific condition is satisfied, to interrupt the maintenance operation and start the printing operation, wherein the specific condition includes that an accumulated time from a start of the maintenance operation to an interruption of the maintenance operation is shorter than a threshold value, and in a case where the instruction is accepted during execution of the maintenance operation and the specific condition is not satisfied, to start the printing operation after the maintenance operation is complete, wherein the specific condition includes a first condition where the maintenance operation is one of a type which should not be interrupted, a second condition where the number of printed sheets since a completion of the previous maintenance operation is equal to or smaller than a criterion, and a third condition where the elapsed time from the completion of the previous maintenance operation is equal to or shorter than a criterion, in a case where all of the first to third conditions are satisfied and the accumulated time is shorter than the threshold value, the control unit interrupts the maintenance operation and starts the printing operation, and in a case where any one of the first to third condition is not satisfied, the control unit starts the printing operation after the maintenance operation is complete, regardless of whether the accumulated time is shorter than the threshold value.

* * * * *